United States Patent [19]

de Haan et al.

[11] 4,366,564
[45] Dec. 28, 1982

[54] APPARATUS FOR WRITING DIGITAL INFORMATION IN A DISC-SHAPED OPTICALLY READABLE RECORD CARRIER

[75] Inventors: Maarten R. de Haan; Marino G. Carasso, both of Eindhoven, Netherlands

[73] Assignee: U.S. Philips Corporation, New York, N.Y.

[21] Appl. No.: 127,349

[22] Filed: Mar. 5, 1980

[30] Foreign Application Priority Data

Jan. 9, 1980 [NL] Netherlands ................. 8000123

[51] Int. Cl.³ ............................ G11B 7/00; H04N 5/76
[52] U.S. Cl. ...................................... 369/48; 358/342;
369/59; 369/60; 369/124
[58] Field of Search ............... 360/36, 37, 26;
358/128.6, 128.5; 179/100.1 G, 100.3 V;
346/76 L; 369/59, 60, 47, 48, 124, 106, 111

[56] References Cited

U.S. PATENT DOCUMENTS

| 3,931,457 | 1/1976 | Mes | 360/72.2 |
| 3,988,531 | 10/1976 | Loub | 360/36 |
| 3,988,532 | 10/1976 | Korpel | 360/36 |
| 4,074,085 | 2/1978 | Russell | 365/120 |

OTHER PUBLICATIONS

"A Review of the MCA Discs-Vision System", by K. D. Broadbent, Journal of the SMPTE, Jul. 1974, vol. 83, pp. 554–559.
"Optical Readout of Videodisc", by Bricot et al., IEEE Transactions on Consumer Electronics, Nov. 1976, p. 307.

*Primary Examiner*—Bernard Konick
*Assistant Examiner*—Alan Faber
*Attorney, Agent, or Firm*—Thomas A. Briody; Robert T. Mayer; Algy Tamoshunas

[57] ABSTRACT

An apparatus for recording optically detectable information in a record carrier provided with information areas arranged in accordance with a spiral or concentric track pattern, which areas alternate with synchronization areas each containing the address of the associated information area. Recording is effected with a first modulated laser beam, while a second beam is projected after the first beam for reading the recorded information. The track pattern has previously been provided with a periodic track modulation of a frequency at which the power spectrum of the information to be recorded has a substantially zero value. The apparatus comprises a first and a second filter for filtering a signal corresponding to the track modulation out of the signal derived by detecting the first or second laser beam reflected or transmitted by the record carrier. In series with the second filter there is included a delay network from which a synchronization signal is available. Furthermore, there is provided a phase comparator which, during reading of the synchronization areas, determines the phase difference between the signals obtained from the first and the second filter and which controls the delay network in such a way that the output signal of the delay network is in phase with the output signal of the first filter.

3 Claims, 27 Drawing Figures

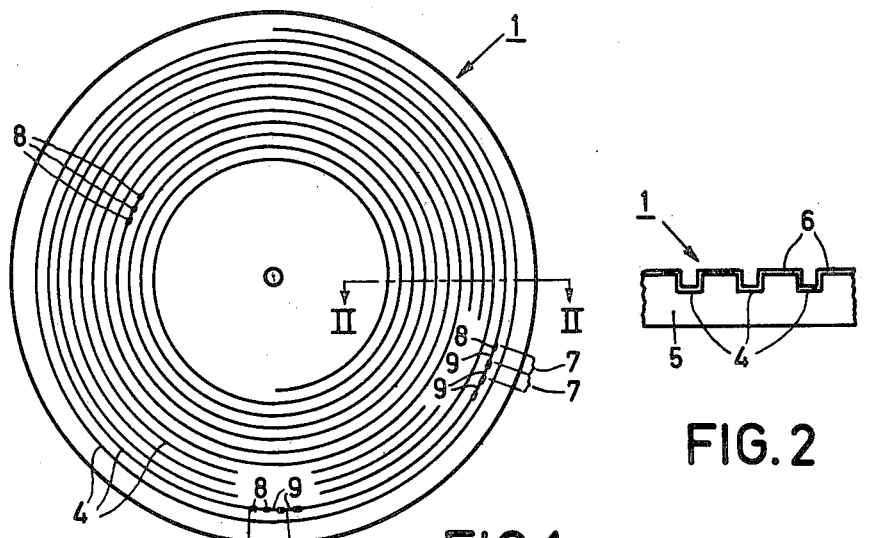
FIG.1a
FIG.2
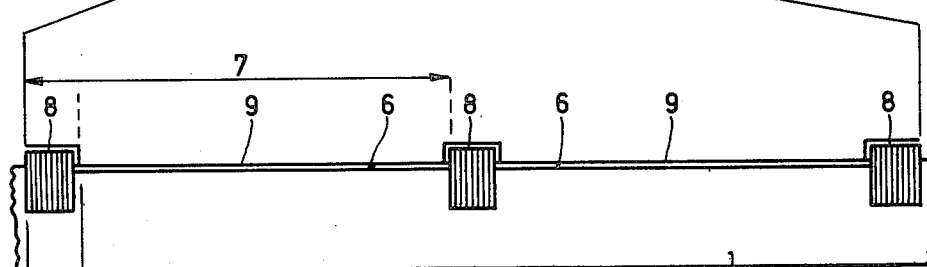
FIG.1b
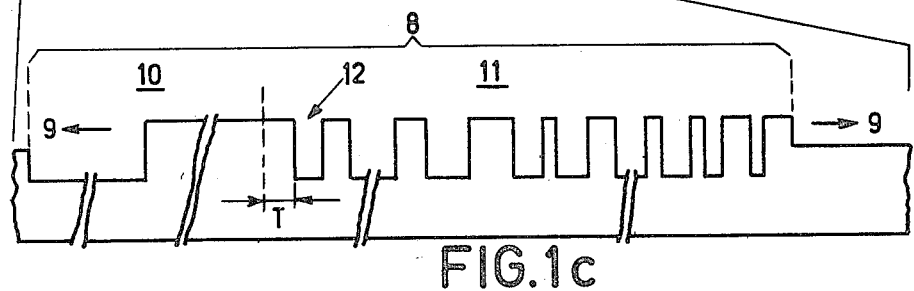
FIG.1c

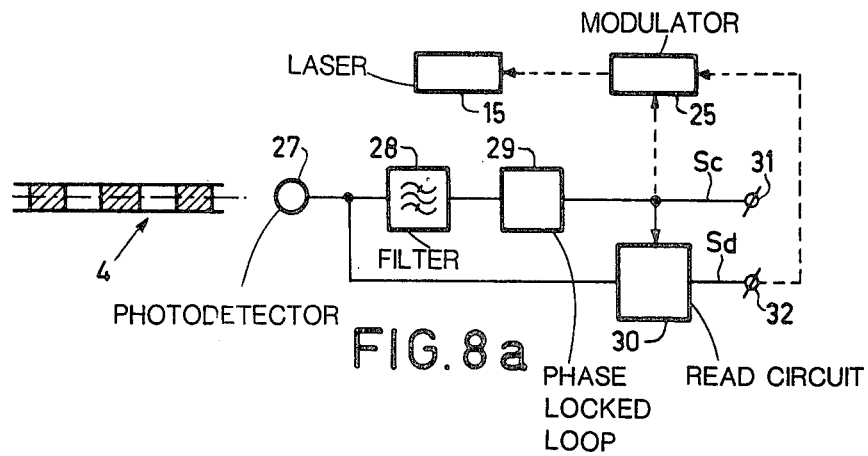
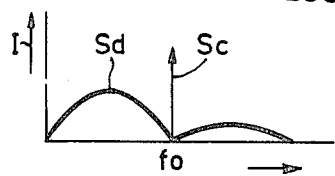
FIG. 8a / FIG. 8b
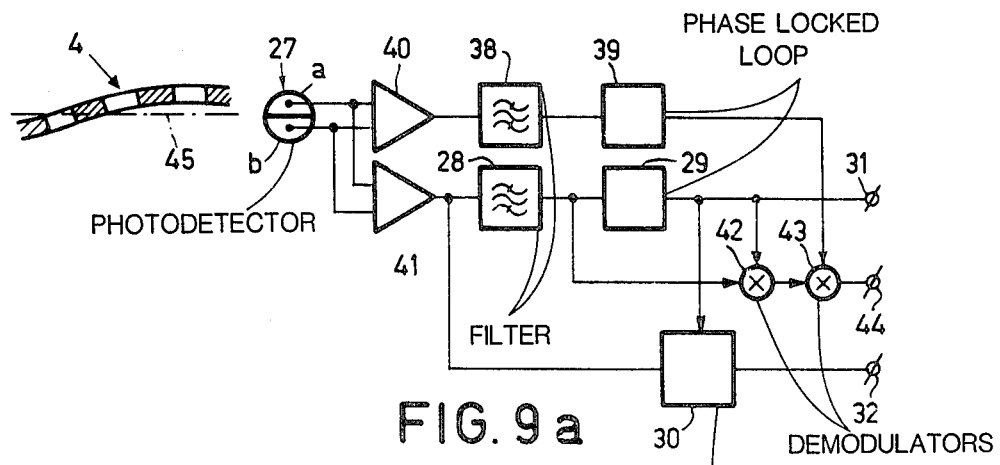
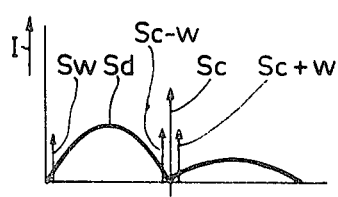
FIG. 9a / FIG. 9b

APPARATUS FOR WRITING DIGITAL INFORMATION IN A DISC-SHAPED OPTICALLY READABLE RECORD CARRIER

The invention relates to an apparatus for writing information in a disc-shaped optically readable recording medium which comprises a substrate having a radiation-sensitive information layer with information areas arranged thereon in accordance with a spiral or concentric track pattern. The information areas alternate with synchronization areas in each of which the address of the associated information area is recorded in an optically detectable manner. The apparatus comprises a light source, an optical system for directing a first light beam to the information areas, a write circuit with modulation means for modulating the light beam, in order to record digitally coded information of fixed bit frequency in the information areas, a first detector for the detection of the radiation of the first light beam which is reflected or transmitted by the record carrier, and a read circuit for decoding the radiation detected by the first detector in order to read the information recorded in the synchronization areas.

Such apparatus is known from Netherlands patent application No. 782859 which has been laid open to public inspection and which corresponds to copending U.S. application Ser. No. 140,409, filed Apr. 14, 1980. In such an apparatus the synchronous recording of data is very intricate, because synchronization information is available only when the synchronization portions are being scanned. The provision of additional synchronization tracks or portions is one of the solutions, but this limits the data storage capacity of the record carrier.

In the U.S. patent application Ser. No. 134,392 filed Mar. 26, 1980, a record carrier is proposed which does not have this problem but which cannot always be utilized in an optimum manner for the recording of data. It is the object of the invention to provide an apparatus of the type mentioned in the preamble which enables the record carrier of the last-mentioned copending application to be utilized in an optimum manner.

To this end the invention is characterized in that the apparatus is adapted to record information in a record carrier whose synchronization areas and information areas exhibit an optically detectable periodic track modulation of a frequency for which the power spectrum of the information to be recorded substantially exhibits a zero point, for generating a clock signal at least during recording, and that the apparatus comprises a second optical system for projecting a second light beam onto the track pattern of the record carrier behind the first light beam, a second detector for detecting the radiation of a second light beam which is reflected or transmitted by the record carrier, a first and a second band-pass filter tuned to the frequency corresponding to the periodic track modulation, the first and the second band-pass filter respectively being connected in series with the first and the second detector, a first adjustable delay network with a control input, an input an an output, of which the input is coupled to an output of the second band-pass filter, and on the output of which a clock signal is available for synchronization of the write circuit, a phase comparison circuit having a first and a second input and an output, of which the first input is connected to an output of the first band-pass filter, of which the second input is connected to the output of the delay network, and of which the output is connected to the control input of the delay network via switching means for adjusting the time delay of said delay network in such a way that the signal on the output thereof is in phase with the signal on the output of the first band-pass filter, and control means for closing the said switching means when the first beam scans synchronization areas and for opening said switching means when the first beam scans information areas.

The apparatus is based on the recognition that the use of the record carrier proposed in the said application Ser. No. 134,392 does solve the synchronization problem, but that the detection of the periodic track modulation in the information sectors during recording by means of light pulses of comparatively high radiation intensities is found to present practical problems, especially at higher bit frequencies. In accordance with the invention use is made of a follower beam—which may also be used for detection and monitoring of the signal being recorded—in order to read the clock signal during recording. When the synchronization portions are read with the first laser beam, the delay network is each time adjusted so that the signal detected by the follower beam is in synchronism with the signal detected by the first beam. The delayed signal is then used as clock signal during recording. The invention is described in more detail with reference to the drawings, in which.

FIG. 1 shows one embodiment of a record carrier to which the inventive principle may be applied, FIG. 1a being a plan view of the record carrier, FIG. 1b showing a part of a track 4 of the record carrier on an enlarged scale, and FIG. 1c showing a synchronization area of said part on an enlarged scale.

FIG. 2 shows a small part of the cross-section taken on the line II—II' in FIG. 1a.

Figure 3:
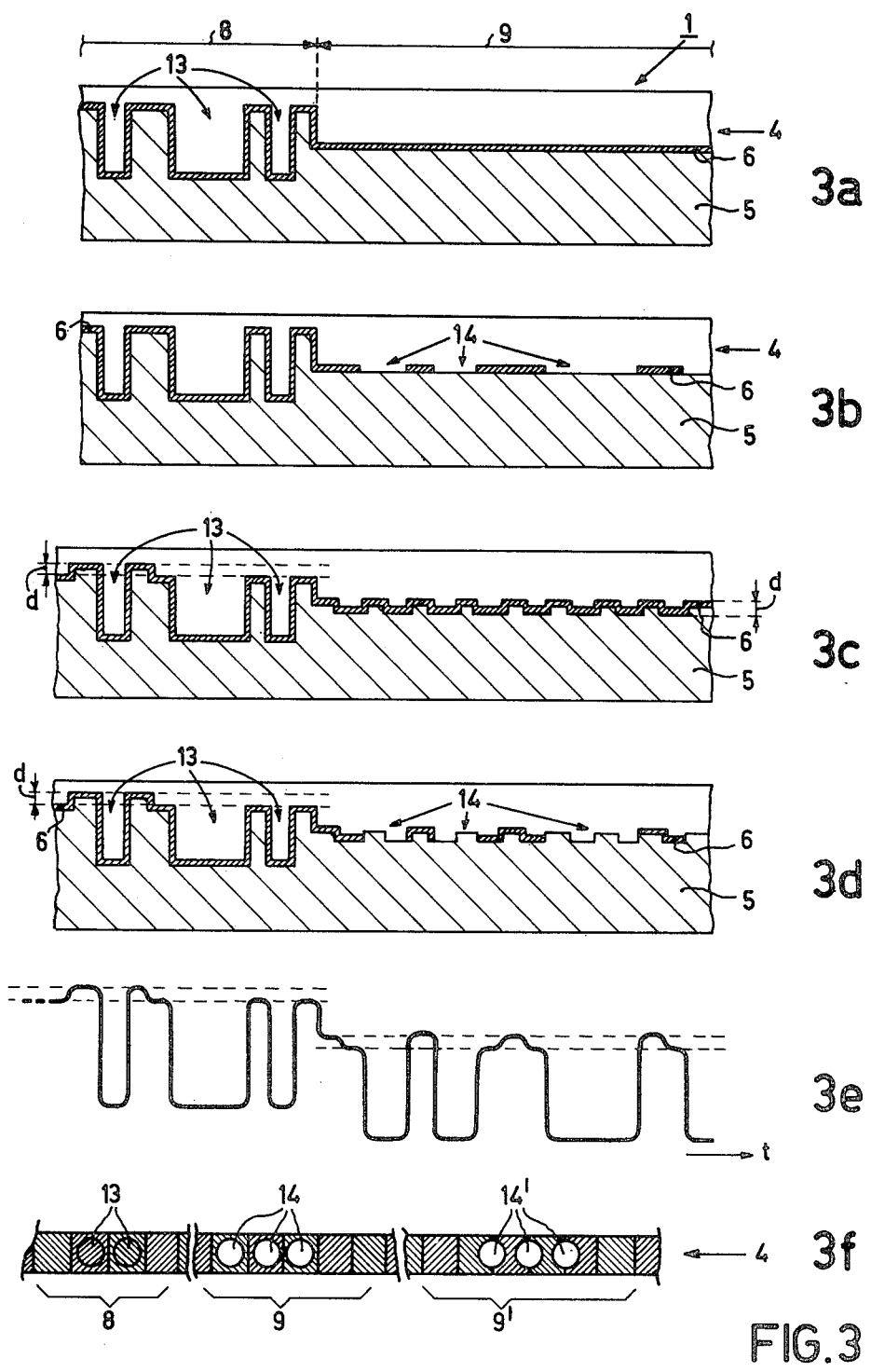
Figure 4:
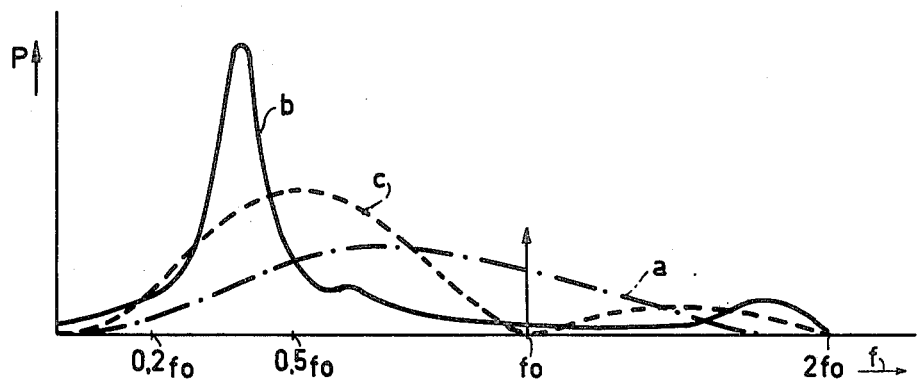
Figure 5:
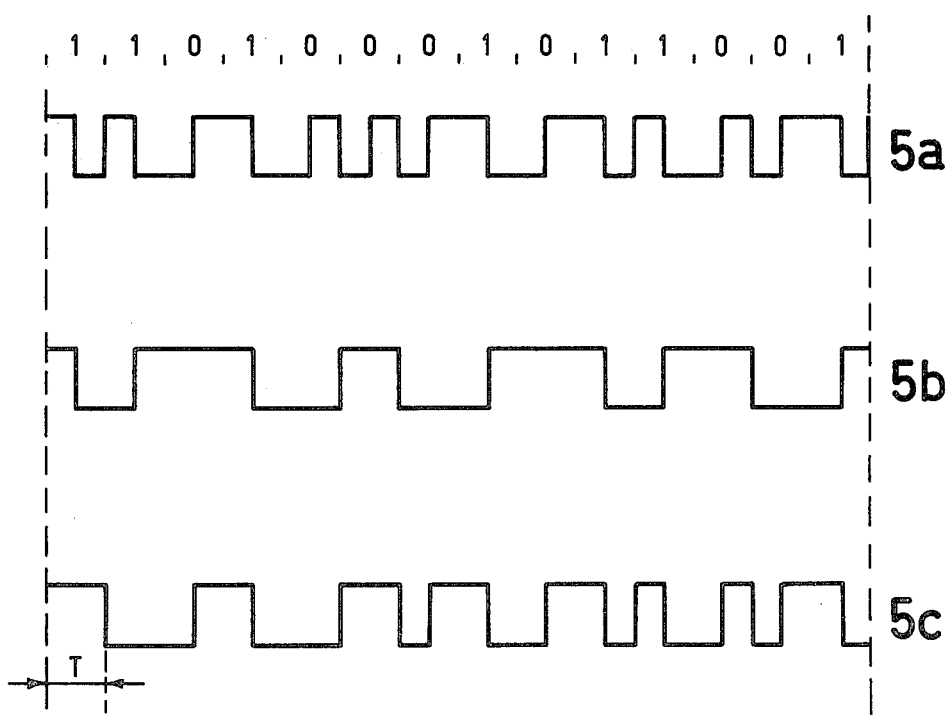
Figure 6A:
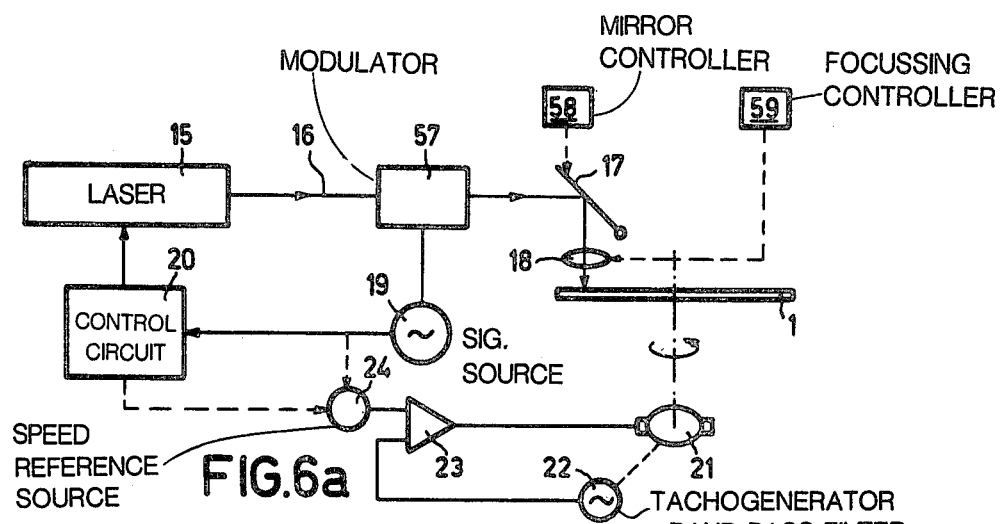
Figure 6B:
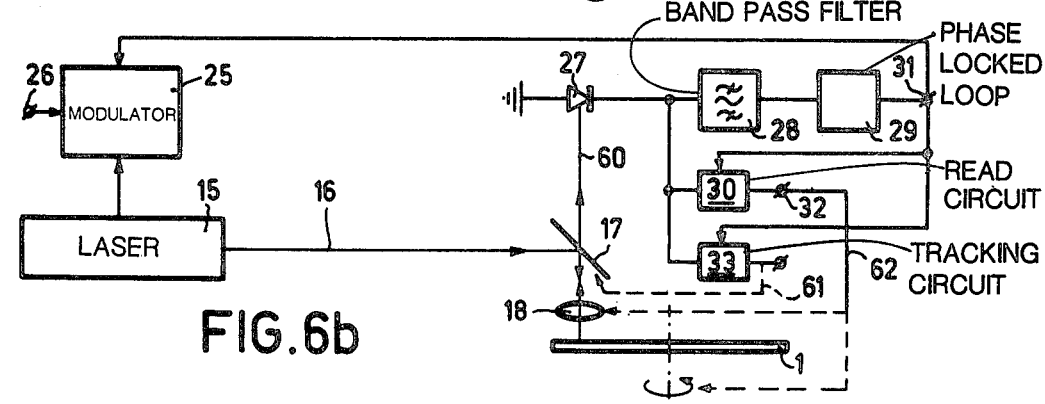
Figure 6C:
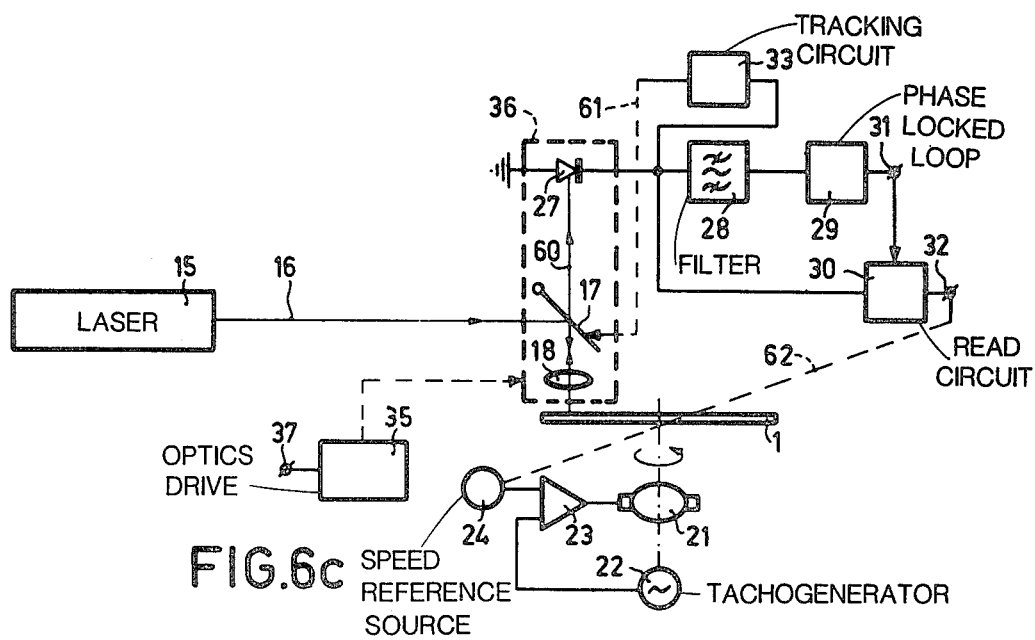
Figure 7:
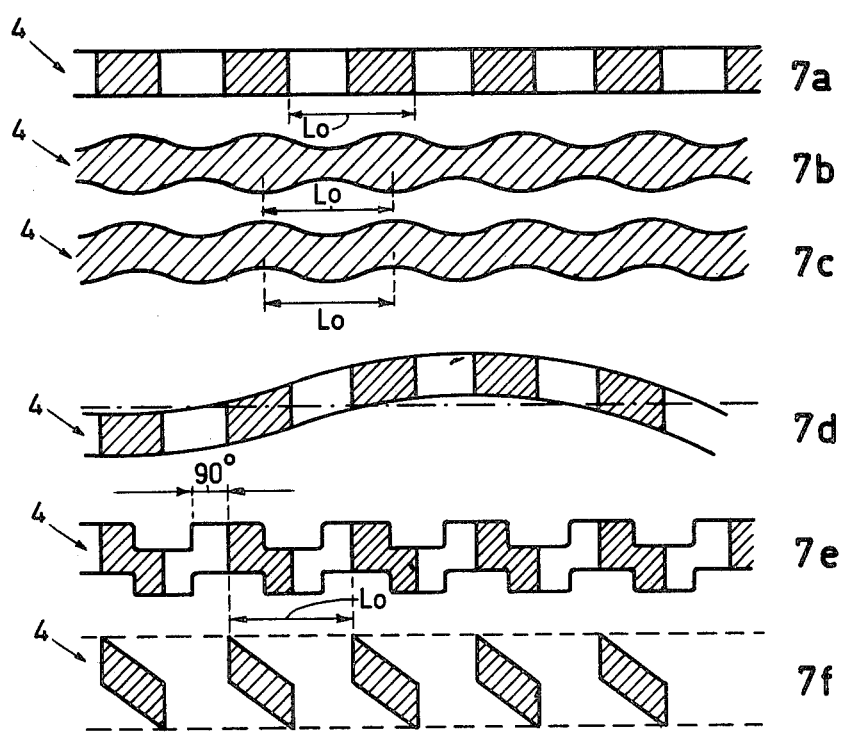

FIG. 3, in FIGS. 3a through 3d, schematically shows a cross-section in the longitudinal direction through a part of the track 4, FIG. 3a showing such a cross-section for a blank prepared disc in accordance with a known technology, FIG. 3b showing said cross-section of FIG. 3a after information has been recorded in the information area 9, FIG. 3c showing such a cross-section of a blank prepared disc in accordance with the invention, FIG. 3d showing the cross-section of FIG. 3c after digital information has been recorded, FIG. 3e schematically representing the signal obtained when reading the part of the track 4 shown in cross-section in FIG. 3d, and FIG. 3f schematically representing a plan view of a part of the track 4 after digital information has been recorded in a manner other than in FIGS. 3b and 3d, FIG. 4 shows the random power spectra of three digital information signal modulations, FIG. 5 is a diagrammatic representation of said modulations, FIG. 6 in FIG. 6a schematically represents an apparatus for manufacturing a record carrier in accordance with FIG. 3c, FIG. 6b schematically represents an apparatus for recording information in the record carrier of FIG. 3c, and FIG. 6c represents an apparatus for reading an inscribed record carrier, FIG. 7 shows a number of examples of a periodic track modulation in accordance with the invention.

FIG. 8a illustrates the principle of a read section of an apparatus for reading and/or recording a digital signal on a record carrier in accordance with the invention, FIG. 8b representing the frequency spectrum of the signal detected by the detector 27, FIG. 9a shows an apparatus in accordance with FIG. 8a, which is also suitable for generating a radial tracking signal, FIG. 9b representing the frequency spectrum of the signal detected by the detector 27.

Figure 10:
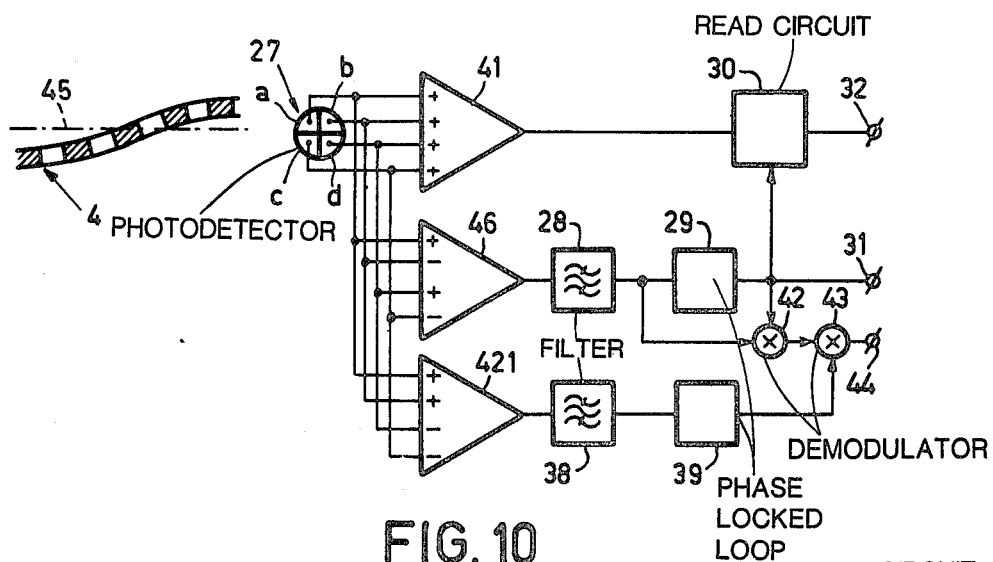
Figure 11A:
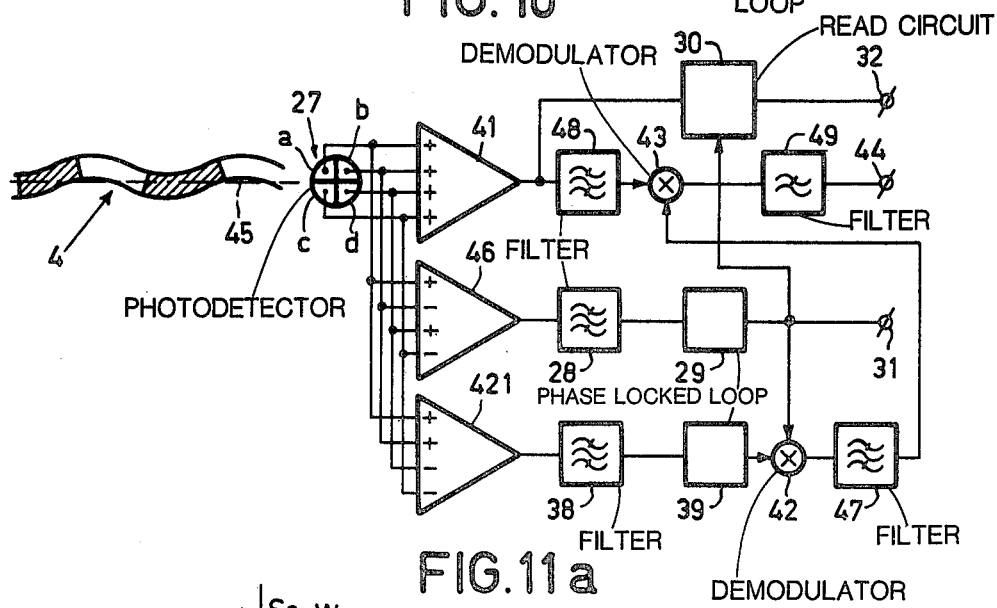
Figure 11B:
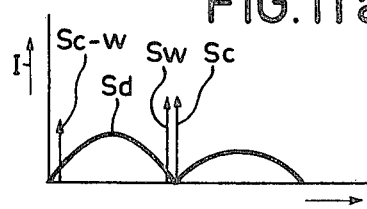
Figure 12:
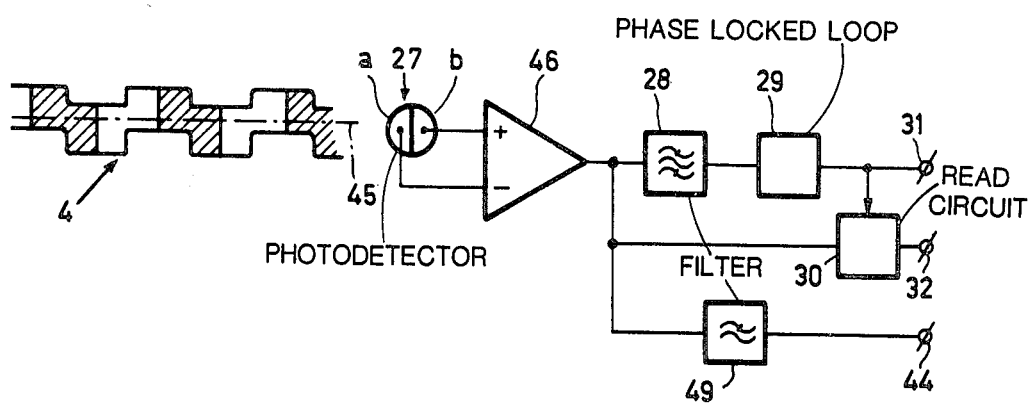
Figure 13:
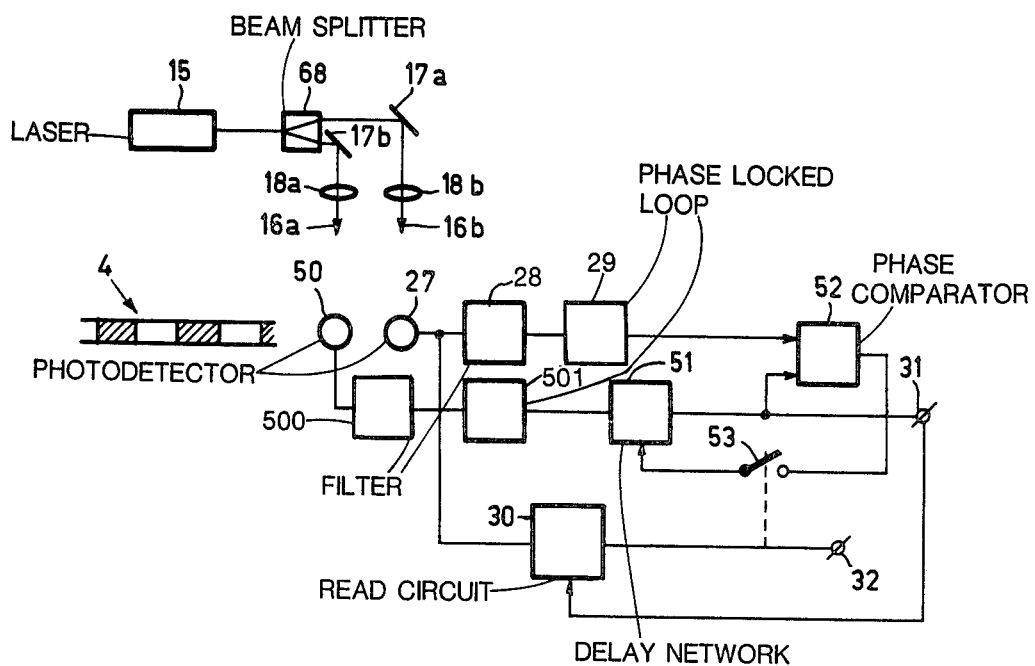

FIG. 10 shows a variant of the apparatus of FIG. 9a,

FIG. 11a shows an apparatus in accordance with FIG. 9a adapted to a record carrier with a radial track modulation of substantially the same period as the periodic track modulation, FIG. 11b representing the frequency spectrum of the signal detected by the detector 27, FIG. 12 shows an apparatus adapted to a record carrier with a radial track modulation of the same period as the periodic track modulation, and FIG. 13 shows a part of an apparatus for recording an information signal on record carrier in accordance with the invention for generating a clock signal during recording, use being made of an auxiliary laser beam.

FIG. 1 shows one embodiment of a record carrier to which the inventive principle may be applied, FIG. 1a showing a plan view of this record carrier, FIG. 1b showing a part of a track 4 of said record carrier on an enlarged scale, and FIG. 1c showing a synchronization area of said part on en enlarged scale. The record carrier body 1 is provided with a spiral track 4. Track 4 is divided into a multitude of sectors 7, for example 128 per revolution. Each sector 7 comprises an information area 9, intended for recording digitally coded information, and a synchronization area 8.

In order to ensure that the digital information is recorded in an accurately defined path, the track 4 is employed as a servo track. For this purpose the information area 9 of the sectors 7 have an amplitude structure shown in FIG. 2. This FIG. 2 shows a small part of the cross-section taken on the line II—II' in FIG. 1a and thus show a number of adjacent track portions, specifically information areas, of the servo track 4. The direction of the servo tracks 4 is thus perpendicular to the plane of drawing. The servo tracks 4, in particular the information areas 9, are thus formed by grooves in the substrate 5. In this way it is possible to make a radiation beam, which is directed at the record carrier in order to record digital information, accurately coincide with said servo track 4, in other words to control the position of the radiation beam in a radial direction via a servo system which employs light reflected by the record carrier. The measurement of the radial position of the radiation spot on the record carrier may be in accordance with systems similar to those employed in optical record carriers provided with a video signal and as inter alia described in "I.E.E.E. Transactions on Consumer Electronics, Nov. 1976, page 307.

For recording of digital information the record carrier body is provided with a layer of a material 6 which, if exposed to suitable radiation, is subject to an optically detectable change. In principle only the information portions 9 of the sectors need be provided with such a layer. However, for reasons of manufacturing technology it is simpler to provide the entire record carrier surface with such a layer. This layer 6 may for example comprise a thin layer of a metal such as tellurium. This metal layer can be melted locally by laser radiation of sufficiently high intensity, so that locally this information layer 6 is given a different reflection coefficient, as a result of which the reflected beam is amplitude-modulated in accordance with the recorded information when an information track thus inscribed is scanned by a read beam.

Alternatively, the layer 6 may be a double layer, for example of aluminium on iron, which react chemically to incident radiation. At the location where a high-power radiation beam is incident on the disc $FeAl_6$ is formed, which is a poor reflector. A similar effect is obtained in the case of a double layer of bismuth on tellurium, $Bi_2Te_3$ being formed. It is also possible to employ a single layer of tellurium.

As with the aid of the servo track in the form of a groove in the substrate 5 the write radiation spot is made to coincide accurately with said servo track, in particular when an information area is being scanned, the digital information modulating the write beam is recorded exactly in the information area coinciding with said servo track.

As is apparent from the foregoing the record carriers intended for the user, in which the information areas do not yet contain information, have a groove structure in said information areas within the sectors. Moreover, within each sector such a record carrier has a synchronization area 8 in the form of an optically detectable relief structure. FIG. 1b on an enlarged scale shows a part of a track 4 with a sequence of a number of information areas 9 and synchronization areas 8. In this case the synchronization areas 8 comprise a relief structure constituted by a sequence of recesses alternating with intermediate areas.

The depth of the recesses in this structure of the synchronization area is greater than the depth of the servo track in the information area 9. This depth of the recesses is selected in accordance with general optical rules and depending on the shape of said recesses in the selected read system in way such that an optimum read-out of the information represented by the structure is obtained. In the case of a read system in which the radiation beam reflected by the record carrier is detected by a single photo-detector, $\frac{1}{4}\lambda$ may be selected as depth for the recesses, $\lambda$ being the wavelength of the radiation used. If for the depth of the servo track in the information area 9 the value $\frac{1}{8}\lambda$ or less is selected, this servo track will hardly affect the amount of light detected by the detector.

In order to further illustrate the structure of the synchronization area, FIG. 1c again shows such a synchronization area on an enlarged scale, the information layer 6 being omitted for the sake of simplicity. Such a synchronization area 8 has two portions, namely an indication portion 10 and an address portion 11. The address portion 11 contains all the information required for controlling the recording process. When recording digital information, this information is converted into a so-called word-organized bit series. The address portion contains information about the word organization, so that during recording the location of the bit words is defined and during reading the bit words are suitably decoded. Furthermore, address portion 11 contains information about the relevant track number. This information is in the form of a relief structure in accordance with a digital modulation technique suitable for the recording medium. Since in addition to the servo track in the form of a groove in the information portions 9, the record carrier already contains, in the synchronization area, all the information required for positioning information in the form of a bit-word-organized bit series in said information areas, the requirements imposed on the write and read apparatus employed by the user may be less stringent. Furthermore, since this fully prerecorded information is in the form of a relief structure, the record carrier is particularly suitable for mass-production, enabling the costomary pressing techniques to be used.

FIGS. 3a through 3d, schematically represents a part of such a servo track 4 in a cross-section in the longitudinal direction of the servo tracks 4 with a part of the synchronization area 8 and a part of the information area 9 with:, FIG. 3a showing such a cross-section of a blank prepared disc using a known technique, FIG. 3b showing such a cross-section after digital information 14 has been recorded in the information area 9, FIG. 3c showing such a cross-section of a blank prepared disc provided with clock information in accordance with the invention, and FIG. 3d representing the cross-section of FIG. 3c after information 14 has been recorded in the information area 9. FIG. 3e schematically represents the signal obtained when reading the part of the track 4 shown in cross-section in FIG. 3d and FIG. 3f schematically shows a plan view of a part of the track 4 after information has been recorded in a manner other than represented in FIGS. 3b and 3d.

The prepared disc is provided with a servo track 4, formed in a substrate 5, for example by means of a laser beam. By modulating the intensity of the laser beam it is then possible to form a relief structure of "pits" 13 containing information in the synchronization area 8. Subsequently, the entire disc, including for the sake of simplicity, the portion of the record carrier 1 outside the grooves 4, may then be coated with the reflecting information layer 6. In the record carrier thus prepared information can be recorded in the information area 9 by forming holes 14 in the reflecting information layer 6, for example by means of a laser beam. Such an inscribed record carrier is shown in FIG. 3b. When information is written, i.e. the holes 14 are formed, and when the information is read, for example by means of a laser beam, it is of importance that this information writing or reading process is synchronized with the aid of a clock signal, about which the synchronization areas 8 may contain information, In order to ensure that during writing and reading a suitable synchronous clock signal is continuously available, i.e. also during writing or reading in the information areas 9, the servo groove 4 is in accordance with the invention, provided with a structure which produces a modulation of the light reflected by the information carrier when the servo track 4 is followed during reading or writing.

However, this structure should be such that it does not disturb the read-out of information. This is accomplished in the manner explained with reference to FIGS. 4 and 5, FIG. 4 representing the random power spectra of three possible binary information-signal modulations and FIG. 5 being a diagrammatic representation of said modulations.

The reference a in FIG. 5 designates a modulation known by the name of "biphase" modulation. In this technique applied digital signal is converted into a binary signal in which a logic "one" of the applied digital signal is positive during the time interval T/2 and negative during the next time interval T/2, T being the bit length of the applied digital signal. A logic "zero" yields exactly the opposite binary signal, i.e. negative for the time interval T/2 and positive for the next time interval T/2. This modulation technique yields a binary signal which has a power spectrum represented by a in FIG. 4. The frequency fo then corresponds to 1/T.

The reference b in FIG. 5 represents the modulation known by the name of "Miller" modulation. The binary signal generated by means of this modulation has a transition halfway a logic "one" of the applied digital signal and at the transition of two consecutive logic "zeros". The frequency spectrum of the binary signal obtained by means of this modulation technique has the designation b in FIG. 4.

Finally, the reference c in FIG. 5 represents a modulation known by the name of "quadphase" modulation, the applied bit series of the digital signal first of all being divided into consecutive groups of two bits. From each two-bit group having a duration of 2T a binary signal is derived which in a first time interval T has the same variation as the original two bits and in the next time interval T an inverse variation. The bit combinations 11, 00, 01 and 10 which are possible are thus converted into the bit combinations 1100, 0011, 0110 and 1001 respectively. The binary signal obtained by means of this modulation technique has a frequency spectrum represented by c in FIG. 4.

It is evident from FIG. 4 that these modulation techniques have the common property that the resulting binary signal exhibits no strong frequency components at comparatively low frequencies, for example frequencies below 0.2 fo. This is very useful when an optical record carrier is used with the associated write and read systems. As stated previously, such systems employ both a servo control in order to keep the scanning spot accurately focussed on the record carrier and a servo control which controls the radial position of the scanning spot so as to ensure that the scanning spot accurately coincides with the information track. Since the control signals required for these servo controls are derived from the radiation beam which is reflected by the record carrier and which is also modulated by the relief structure of the synchronization area, it is essential that the frequency spectrum of the binary signal stored in the address portion does not contain any strong frequency components within the frequency band intended for the control signals. FIG. 4 thus shows that the frequency band below approximately 0.2 fo is suitable for such control signals. The control signals for the servo systems may for example extend to a maximum frequency of 15 kHz. If for the frequency fo=1/T, for example, the value 500 kHz is selected, it will be evident from FIG. 5 that the binary signals a, b or c only exhibit very weak frequency components at frequencies of 15 kHz and lower. Furthermore it is apparent from FIG. 4 that at the frequency 2 fo and in the case of modulation method c the spectrum also has zero points at the frequency fo, Thus, it is possible to provide the record carrier with a clock structure of the frequency 2 fo without interference with the information signal. Zero points at the frequency 2 fo also occur in the case of other modulation methods.

When quadphase modulation (modulation c) is used and also in the case of some other modulation methods, the frequency fo is highly suitable for this purpose, said frequency corresponding to the bit frequency 1/T, so that this quadphase modulation becomes very attractive. Also in the case of modulation method b a structure with the frequency fo may be used in some cases because the components of the spectrum of modulation b are comparatively small at that frequency. Furthermore, it is theoretically possible to give the structure a modulation corresponding to a frequency higher than 2 fo, but in practice this is generally not feasible. Indeed, in view of a maximum information density, the dimensions of the pits 13 and 14, which at a specific speed of rotation of the disc 1 at least correspond to a bit length of ½T, are selected nearest the resolution of the write/read system used, so that the surface structure corresponding to frequencies higher than 2 fo will hardly be detectable. By means of special modulation techniques it is also possible to obtain zero points in the power spectra at frequencies other than fo or 2 fo, for example at ½ fo.

FIG. 3c shows a cross-section of a record carrier in accordance with the invention corresponding to the cross-section of FIG. 3a, whose surface at least at the location of the track 4 has been provided with a relief structure having a height d. One way of realizing this structure is to modulate the laser by means of which the synchronization area 8 and the groove 4 of the information area 9 is formed. In the present example this has only be done in the synchronizaton area 8 between the pits 13 by limiting the intensity of the laser beam. However, in principle it is also possible to provide the bottoms of the pits with a relief structure. As shown in FIG. 3d the disc in accordance with the invention can also be provided with information by forming holes 14 in the reflecting layer 6 covering the relief structure. FIG. 3c shows an example of a signal obtained when reading a relief structure in accordance with FIG. 3d. This signal exhibits minima at the location of the pits 13 or the holes 14 and an amplitude modulation (d in FIG. 3c) corresponding to the modulation structure with the frequency fo at the maxima. The modulation structure of the bottoms of the holes 14 hardly contributes to the signal, because it hardly reflects any light owing to the removal of the reflecting layer 6. In this respect it is to be noted that it is for example also possible to provide a non-reflecting layer 6 on a reflecting substrate 5, which layer is locally removed. As a result of this the modulation of the frequency fo will be read satisfactorily at the very locations 14 where the non-reflecting layer has been removed.

In FIGS. 3a–3d the pits 13 or the holes 14 are shown as continuous holes or pits, i.e. in the case of more than one bit as an elongate slot having a length corresponding to the number of consecutive bits. However, it is alternatively possible to provide a separate pit or hole for each bit. FIG. 3f illustrates this and shows a track 4 in which the clock modulation structure is represented by different types of hatching. In the synchronization area 8 the pits 13 may for example be formed in the centre of the maxima or minima of the structure and are also coated with a reflecting layer 6, which is symbolized by the latching through said pits 13. In the information portion 8 the information holes 14 may be formed in the reflecting layer 6 at the maxima and minima of the clock information structure. Alternatively—as is represented by the information area 9 in FIG. 3f—holes 14' may be formed at the zero points of the information structure. In this respect the location of the pits 13 or holes 14 is not essential, provided that the phase relationship with the clock information structure is fixed and known. Neither is the shape of the information structure of great significance. Instead of the rectangular shape shown in FIG. 3 it may well have a sinusoidal shape, which is readily possible in the case of manufacture by means of a modulated laser beam. It is of importance only that said clock synchronization structure exhibits a frequency component which can readily be detected at the frequency fo or 2 fo and which exhibits no strong components within the spectrum of the synchronization or digital-information signal recorded or to be recorded. This is generally the case when the clock information structure d has a fundamental frequency fo or 2 fo with higher order harmonics only; the next harmonic is then 2 fo or 4 fo, which, as shown in FIG. 4, falls beyond the part of the information spectrum that is of interest.

In order to illustrate how structures in accordance with FIG. 3 can be realized FIG. 6a schematically shows an apparatus for manufacturing a record carrier of FIG. 3c, FIG. 6b an apparatus for recording information in the record carrier of FIG. 3c, and FIG. 6c an apparatus for reading such an inscribed record carrier.

In the apparatus of FIG. 6a the beam 16 from a laser 15 is projected at a rotating disc 1 via for example an intensity modulator 57, a mirror 17 and a focusing optic 18, in order to form the spiral groove 4 (FIG. 1). The laser 15 is controlled by a circuit 20 for pulsating the laser 15 so as to form the pits 13 (FIG. 3) in the synchronization area 8. The modulator 57 is controlled by a source 19 having a frequency fo (or 2 fo) in order to realize a clock modulation structure in the groove 4. Alternatively, it is possible to modulate the laser 15 itself. The disc 1 is driven by a motor 21 whose speed is controlled by a servo control, which may for example comprise a tachogenerator 22, a speed-reference source 24, and a servoamplifier 23. In order to ensure that the recording areas 8 are situated at the correct location on the disc in the track 4 and, as the case may be, to obtain a correct tangential distribution of the modulation fo on the disc, the circuit 20 and, as the case may be, the source 19 of the frequency fo may be locked to the servo control. Furthermore the circuit 20 is controlled by the source 19 in order to guarantee a correct phase relationship of the synchronization pits 30 with the clock modulation structure. After this process the disc 1 may be provided with the layer 6.

FIG. 6b schematically represents an apparatus for providing the prepared disc 6 with information and simultaneously reading the clock modulation structure. This apparatus comprises the rotating disc 1, and a laser 15 whose beam 16 is projected, via a semitransparent mirror 17 and a focusing optic 18, onto the disc 1. A reflected beam 30 is detected by means of a cell 27, for example a photodiode, and converted into an electric signal from which the component of the frequency fo (or 2 fo) is extracted by means of the band-pass filter 28, That component is produced mainly by the clock modulation structure formed in the track 4. As the case may be, this signal may also be applied to a phase-locked loop 29, which improves the filtration, increases the constancy of the clock signal and, as the case may be, compensates for brief signal dropouts. The clock signal is then available on output 31. Data can be recorded by pulse modulation of the laser beam 16, directly by including a modulator in the beam or, as is shown in FIG. 6b, by modulating the laser 15 itself with a write modulator circuit 25, to which the information is applied via an input 26 and which is synchronized with the clock signal on output 31.

The light-sensitive element 27 and a read circuit 30 are used to recover the information contained in the synchronization portions from the reflected beam 60, which information appears on an output 32. The read circuit 30 may also be synchronized with the clock signal on output 31. The recovered information may be used to synchronize the circuit 25 and to locate the correct position on the disc. This information is also used in a servo control, not shown in FIG. 6b, for radially positioning the optic 18 and the mirror 17, for inscribing the desired portion of the track 4 and for controlling the drive of the disc 1, which is symbolically represented by the dashed line 62 in FIG. 6b.

Furthermore, the apparatus may be provided with a tracking circuit 33 which derives a tracking signal from the signal supplied by the detector 27 in order to keep the beam 16 on the track 4 by controlling the angle relative to the beam 16 of the mirror 17, which is symbolized by the dashed line 61 in FIG. 6b.

FIG. 6c shows an apparatus for reading an inscribed disc 1, which apparatus is generally combined with that of FIG. 6b. The apparatus again comprises a laser 15, whose beam 16 is projected onto the disc 1 via a mirror 17 and the optic 18. The reflected beam 60 is detected with a photodiode 27 and the resulting electric signal is passed through a band-pass filter 28 having a pass frequency fo and a phase-locked loop 29 tuned to the frequency fo, so that the clock signal of the frequency fo (or 2 fo) is available on output 31. The information recorded on the disc is decoded from the electric signal supplied by the photodiode 27 by means of the read circuit 30, so that on an output 32 thereof the digital information and the information contained in the synchronizaton areas 8 is available. This read circuit is synchronized by means of the clock signal on output 31. In addition, a tracking signal may be derived from the beam detected by photodiode 27 by means of a tracking circuit 33, in order to control the mirror 17 in such a way that the beam 16 exactly follows the track 4. The disc drive motor 21 may be included in a servo control, for example comprising a tachogenerator 22, a reference source 24, and a servo amplifier 23, in order to control the speed, which control may be locked to the read circuit 30. Furthermore, the apparatus also comprises a control mechanism 35 for moving the optic 18 together with the mirror 17 and the detector 27—the complete mechanism being designated 36 in FIG. 6c—in a radial direction, so that a desired, a specific part of the disc can be read, controlled by information applied to an input 37 of the control mechanism 35 and by the information produced by the synchronizaton areas and available on output 32 of the read circuit 30.

The clock information structure which is or has been recorded in track 4 may take various forms. FIG. 7 shows a number of examples thereof. FIG. 7a schematically represents a track 4 in which the clock information is formed by a height variation—symbolically represented by the interrupted hatching—for example by modulating the intensity of the laser beam that writes the track 4, FIG. 7b shows the track 4 in which the clock information is formed as a width variation of the track 4, for example by modulation of the laser-beam focusing, for which for example the objective 18 (FIG. 16a) may be controlled by means of the device 59 (FIG. 6a)—whilst a combination of width and depth variations is also possible, which in practice will frequently be the case when the intensity or focusing of the laser beam is modulated—and FIG. 7c shows the track 4 in which the clock information takes the form of a radial variation of the position of the track 4, for which purpose for example the angle of the mirror 17 (FIG. 6c) relative to the beam 16 can be modulated by means of the device 58. All the variations shown then have a period length Lo which is equal to Lo=V/f, where V is the tangential speed of the disc 1 at said location and f the frequency of the desired clock signal, which frequency f corresponds to a zero point in the random frequency spectrum of the data to be recorded, for example the frequency fo (FIGS. 4c and 5c) in the case of "quadphase" modulation.

One of the possibilities of obtaining a tracking signal is by providing a radial "wobble" in the groove-shaped track, for example by controlling the mirror 17 (FIG. 6a), i.e. a for example sinusoidally varying radial excursion with a wavelength on the disc which during playback at the normal speed produces a light intensity variation detected by the detector 27 (FIG. 6), whose frequency is situated outside the spectrum of the data, i.e. for example below the frequency 0.2 fo (FIG. 4). For example by synchronous detection, a measure of the deviation of the centre of the detector relative to the centre of the track 4 may be derived from said signal component. Such a radial wobble may be combined with a clock modulation structure, for example the clock modulation structure shown in FIG. 7a, which combination is shown in FIG. 7d. A special combination is obtained when the wobble on the disc has a wavelength equal to that of the clock modulation structure with a fixed phase relationship, which makes synchronous detection superfluous.

FIG. 7e shows such a structure, a depth modulation structure (represented by alternately hatched and non-hatched areas) in track 4 being combined with a radial positional variation which is 90° shifted relative thereto (i.e. a quarter of the period of said structure), which structure can be produced with the apparatus of FIG. 6a by modulating the angle of the mirror 17 relative to the beam 16 with the aid of the device 58. If the depth modulation structure is then selected so that the "shallow" parts of these modulations coincide with the surface of the disc-shaped record carrier 1, the servo track 4 will take the form of a sequence of radially asymmetrical pits which are tangentially spaced from each other by distances equal to the said distance Lo. FIG. 7f shows an example of such a track 4.

FIG. 8a illustrates the principle of the read section of an apparatus for writing data in or reading data from a record carrier in accordance with the invention, the frequency spectrum of the signal I detected by the detector 27 being shown in FIG. 8b. The apparatus comprises a photodetector 27, along which the track 4 is passed. The signal which is supplied by the detector 27 has a spectrum as shown in FIG. 8b, in the present example with the spectrum of a quadphase modulated signal Sd and a clock signal Sc. The clock signal Sc is extracted with the aid of a band-pass filter 28, preferably followed by a phase-locked loop 29. The clock signal Sc is available on output 31. The digital signal Sd, i.e. the signal recorded in the synchronization area 8 and during reading the signal recorded in the synchronization area 8 and in the information area 9, is detected with a read circuit 30 which is synchronized with the clock signal Sc. The data signal read is available on output 32. Furthermore, a radial tracking signal can be derived from the signal from the detector 27. When information is recorded in information areas 9 the circuit 30 only detects the information contained in the synchronization areas 8, which together with the clock signal Sc is then applied to the write circuit 25 in order to modulate the beam of a write laser 15.

When a low-frequency radial wobble is used in order to obtain a radial tracking signal, the apparatus of FIG. 9a may be used, FIG. 9b showing the frequency spectrum of the signal detected by the detector 27. When a track 4 with a radial wobble is read it is advantageous to employ a photodetector 27 which is divided in two sections a and b along an axial line. A differential amplifier 40 or equivalent means forms the difference of the signals detected by sections a and b a summing amplifier 41 or equivalent means provides the sum of said signals. The frequency spectrum (FIG. 9b) again contains the spectrum of the quadphase modulated signal Sd, the clock signal Sc and the low-frequency signal Sw produced by the wobble. In the sum signal the wobble manifests itself as an amplitude modulation with the clock signal Sc as carrier wave, which in FIG. 9b is represented as side bands Sc−w and Sc+w, which side bands have an amplitude equal to zero when the detector 27 exactly follows the centre 45 of the track 4. Filtering the sum signal with the band-pass filter 28 yields the clock signal Sc and, if the filter is not too narrowbanded, also said side bands. The output signal of said band-pass filter 28 is applied to the phase-locked loop 29 and on an output 31 thereof the clock signal Sc is available. The output signal of this band-pass filter 28 is also applied to a synchronous demodulator 42 together with the clock signal Sc. This demodulator then produces the modulation Sw.

The frequency of the radial wobble is recovered from the difference signal from amplifier 40 with the aid of band-pass filter 38 and phase-locked loop 39, which frequency together with the output signal of the synchronous detector 42 is applied to a synchronous detector 43. On the output 44 thereof the modulation of the wobble signal Sw is then available, which may be used as radial tracking signal and is representative of the deviation of the detector 4 relative to the centre of the track 4, which in FIG. 9a is represented by the dashed line 45. Said radial tracking signal can then control the mirror 17 as is symbolically represented in FIGS. 6b and 6c.

The data contained in the track 4 is then recovered from the sum signal on the output of amplifier 41 in a similar way as in the apparatus of FIG. 8a. In respect of information recording similar steps may be applied as in the apparatus of FIG. 8a, which also valid for the apparatus of FIG. 10, FIG. 11a and FIG. 12.

FIG. 10 shows a variant of the apparatus in accordance with FIG. 9, which yields a better signal separation. The detector 27 has also been divided in accordance with a tangential line, so that four quadrants a, b, c and d are obtained, the sections a, b and c, d respectively being situated on either side of the tangential line, and the sections a, c and b, d respectively being situated on either side of the radial line. An amplifier 41 or equivalent means determines the sum of the signals generated by the sections a, b, c and d, so that this amplifier is specifically sensitive to intensity variations of the beam reflected by the track 4, i.e. to the data signal Sd, an amplifier 421 determines the difference between the sections a+b and c+d situated on either side of the tangential line, so that said amplifier 421 is particularly sensitive to variations of the track 4 in a tengential direction, i.e. to the clock signal Sc, and an amplifier 46 determines the difference between the sections a+c and b+d situated on either side of the radial line, so that this amplifier is particularly sensitive to variations of the track 4 in a radial direction, i.e. to the signal Sw corresponding to the wobble.

In a similar way as in the apparatus of FIG. 9a the clock signal Sc is recovered from the output signal of amplifier 46 by means of band-pass filter 28 and phase-locked loop 29 and the frequency of the wobble signal Sw by means of band-pass filter 38 and phase-locked loop 39. The output signal of the band-pass filter 28, which contains the wobble signal Sw as an amplitude modulation of the clock signal Sc, is detected synchronous with the clock signal by means of synchronous detector 42 and yields the wobble signal Sw whose amplitude variation represents the deviation of the detector 27 relative to the centre 45 of track 4. Said signal Sw is detected synchronously with the output signal of phase-locked loop 39, i.e. the wobble frequencies, by means of synchronous detector 43, so that the radial tracking signal appears on output 44. The data signal is recovered from the output signal of amplifier 41, synchronised by the clock signal Sc, by means of the read circuit 30.

Mathematically, the operation of the apparatus of FIGS. 9a and 10 in respect of the recovery of the radial tracking signal may be explained as follows. The signal I detected by the detector 27 is a product of the clock modulation, the wobble modulation and the radial tracking error, which (when ignoring the data signal) may be expressed as:

$$I = Ar\ sin\ (w_w T)\ sin\ (w_c t)$$

where Ar is a function of the tracking error, $w_w$ the angular frequency of the wobble signal Sw, $w_c$ is the angular frequency of the pilot signal Sc, and t the time. Synchronous detection with the pilot signal Sc yields the term $Ar\ sin\ (w_w t)$ and subsequent synchronous detection with the wobble frequency $w_w$ yields the signal Ar.

FIG. 11a shows a read section of an apparatus for reading data from a track 4 with a clock modulation structure and a wobble for deriving a radial tracking signal, the frequency of the wobble signal Sw being substantially equal to the frequency of the clock signal Sc, and FIG. 11b shows the frequency spectrum in which Sd represents the data signal and Sc-w the term having a frequency equal to the difference between the frequencies of the clock signal Sc and the wobble signal Sw, which difference is for example 30 kHz, said term being obtained in that the photodiode 27 receives the product of the wobble modulation and the clock modulation. As a result of this, said term is situated in the low-frequency part of the spectrum and is hardly disturbed by the digital information. The amplitude of this term constitutes the radial tracking signal. The amplitude is zero if the centre line 45 of the track is followed exactly. The wobble then yields a term of double the difference frequencies, which term is not used, and a term with the wobble frequency itself.

The apparatus, in a similar way as the apparatus of FIG. 10, comprises an amplifier 41 for supplying the sum of the signals supplied by sections a, b, c and d of photodiode 27, from which sum the term of said difference frequency is extracted by means of the band-pass filter 48. With the aid of a synchronous detector 43, to which said difference frequency is applied, this term is demodulated and, as the case may be via a low-pass filter 49, the radial tracking signal appears on output 44.

The clock signal Sc is obtained in a similar way as in the apparatus of FIG. 10 by determining the difference between the signals supplied by the two radial halves a+c and b+d of photodiode 27 with amplifier 46 and applying said difference to a phase-locked loop 29 after filtration with band-pass filter 28. In a similar way as in the apparatus of FIG. 10 the wobble signal Sw is derived by determining the difference between the signals supplied by the two axial halves a+b and c+d of photodiode 27 with amplifier 421 and applying this to a phase-locked loop 39 via a band-pass filter 38. The difference frequency applied to the read circuit detector 43 is obtained by applying the clock signal $S_c$ thus obtained and the wobble signal Sw to a synchronous detector 42, after which the resulting signal of said difference frequency is applied to synchronous detector 43 via band-pass filter 47.

With the read circuit 30, synchronized with the clock signal Sc, the data signal can be recovered from the output signal of amplifier 41.

If the frequency of the wobble signal Sw is selected to equal the frequency of the clock signal, it will be evident from FIG. 11b that the term with the difference frequency directly constitutes the DC tracking signal. This tracking signal can then be obtained without synchronous detection.

The phase difference between the two track modulations should be unequal to zero, because only one modulation can be distinguished when the two modulations are in phase. It is found that 90° is an optimum phase difference.

FIGS. 7e and 7d show such a structure, which can be read with the simple read circuit of FIG. 12.

In the apparatus of FIG. 12 the photodiode 27 is divided into two radial halves a and b for an optimum detection of the clock signal Sc, which is obtained on output 31 by determining the difference between the signals supplied by the two halves a and b with amplifier 46, by filtering said signal with band-pass filter 28 and applying it to the phase-locked loop 29. By filtering the output signal of amplifier 46 with a low-pass filter 49 the radial tracking signal is directly available on output 44. The digital signal is recovered from the difference signal with read circuit 30, which is synchronized with the clock signal Sc. Alternatively, it is possible to recover the data signal and the low-frequency tracking signal from the sum of the two halves.

In respect of the tracking during the recording of data signals the apparatus in accordance with FIGS. 8a through 12 may be extended with a device modulating a laser beam 16, which device is synchronized with the clock signal Sc and the signal read from the synchronization areas, as has been explained with reference to FIG. 6b.

In the foregoing it has been assumed that one detector 27 is used for detecting the reflected beam 16 (FIG. 6). Especially at high bit frequencies it may be problematic, when recording data in the informaton areas 9 with a laser beam which is comparatively powerfull relative to that used for reading, to recover the clock information from the beam which is reflected between every two write pulses. For that reason a follower laser-beam may be employed to detect the recorded data and in that case the apparatus of FIG. 13 may be used for writing information. In such an arrangement the track 4, which travels in the direction of the arrow 63 relative to the detector 27, is scanned by an information-writing beam 16a and a follower beam 16b. The two beams can, for example, be obtained by means of a beam splitter 68, mirrors 70a and 70b and optical systems 18a and 18b. In order to modulate the beam 16a, a modulator may be arranged in the beam 16a. The apparatus comprises a photo-diode 27 and with respect to read out of data signals and tracking signals fully corresponds to the apparatus shown in any of the FIGS. 8a, 9a, 10, 11a or 12a. Furthermore, the apparatus comprises a photodiode 50 for detecting the reflection of the follower beam 16b which is projected onto the track at some distance behind the beam 16a. During the read process, and also when the synchronization areas 8 are being read, the clock signal Sc is obtained by applying the signal detected by photodiode 27 to the phase-locked loop 29 via an amplifier which for simplicity is not shown in this Figure (for example 46 in FIG. 11a) and a band-pass filter. In addition, in particular during the writing process, the clock signal is also recovered in a similar way from the signal detected by photodiode 50, as the case may be via a band-pass filter 500 and via a phase-locked loop 501, but this signal is delayed relative to the clock signal obtained via photodiode 27. Via a delay device 51, the output signal is applied to output 31. The phase of the delayed clock signal is then compared with the phase of the clock signal obtained by means of the photo diode 27 in phase comparator 52 and via switch 53 the delay device 51 is adjusted so that the clock signal from photodiode 50, which has been delayed via delay device 51, is in phase with the signal obtained via photodiode 27. During the read-out of the synchronizaton areas 8 switch 53 is closed and the delay device 51 is adjusted so that the clock signal from photodiode 50, which has been delayed by said delay device 51, is in phase with the clock signal obtained via photodiode 27. During the recording of data in the information areas 9 switch 53 is open and the clock signal is recovered from the reflected auxiliary beam 16b via photodiode 50 and is delayed with the delay device 51 by the time adjusted during the read-out of the synchronization areas 8. The switch 53 is operated on command of the synchronization signals read from the synchronization areas by the read circuit 30.

In this respect it is to be noted that writing information with unit pits, i.e. the information is recorded with separately detectable changes in the surface structure of the record carrier, as is shown in FIG. 3f, yields a frequency component at the frequency 2 fo in the spectrum (FIG. 4) of the signal being read. This need not be a problem for the use of a clock modulation structure, because this clock modulation, if it has a frequency equal to 2 fo, may be used when recording information, and if during recording a correct phase relationship with the clock signal is maintained during read-out it will coincide, with the component 2 fo as a result of the use of unit pits. When quadphase modulation is used (FIGS. 4c and 5c) the clock signal will have a frequency equal to fo and in that case said component of the frequency 2 fo is not disturbing.

The invention is not limited to the embodiments shown, which relate to a data storage medium with a subdivision into sectors. The invention may also be used in prepared record carriers for the storage of digitally coded, audio, video and other information in more or less continuous information areas.

Furthermore the invention is not limited to record carriers in which the recorded information is detected via reflection of the laser beam, but may also be employed in record carriers where the recorded information is detected by detecting the radiation transmitted by the record carrier.

Although the description with reference to the Figures is based on the use of laser beams, it is alternatively possible, in particular during reading, to employ focused non-coherent light beams.

What is claimed is:

1. An apparatus for writing information in a optically detectable form on a recording medium having a substrate provided with a radiation-sensitive information layer and with information areas arranged in a spiral or circular track pattern and alternating with synchronization areas, said synchronization areas each containing an optically detectable address of an associated information area, said synchronization and information areas having an optically detectable periodic track modulation which is representative of a clock signal and which is of a frequency at which the power spectrum of the information to be recorded is at a substantially zero value, said apparatus comprising a light source, first means for directing a first light beam onto said information areas, means responsive to the clock signal for modulating said first light beam in order to record digitally coded information of fixed bit frequency in said information areas, first means for detecting radiation of said first beam which is reflected or transmitted by said medium, to produce a first electrical signal representative of the information recorded in said synchronization areas and of said clock signal, first means for extracting said clock signal from said first signal, second means for projecting a second light beam onto said track pattern behind said first light beam, second means for detecting radiation of said second beam which is reflected from or transmitted by said recording medium to produce a second electrical signal representitive of the information read by said second beam, second means for extracting said clock signal from said second signal, means for comparing the phase of said clock signals extracted from said first and second signals, respectively, to produce a control signal indicative of the phase difference therebetween, adjustable delay means responsive to said control signal for delaying the clock signal extracted by said second extracting means by an amount such that the clock signal extracted thereby is in phase with the clock signal extracted by said first extracting means when said first beam scans said synchronizaton areas and means for applying said clock signal to said modulating means.

2. The apparatus according to claim 1 including switching means for applying said control signal to said delay means and means for controlling said switching means such that said switching means is closed and said control signal is applied to said delay means when said first beam scans said synchronization areas and said switching means is open when said first beam scans information areas.

3. The apparatus according to claims 1 or 2 wherein said first and second extracting means each includes a band pass filter tuned to said frequency of said periodic track modulation, each filter being connected in series with a respective one of said detecting means.

* * * * *